Figure 1:
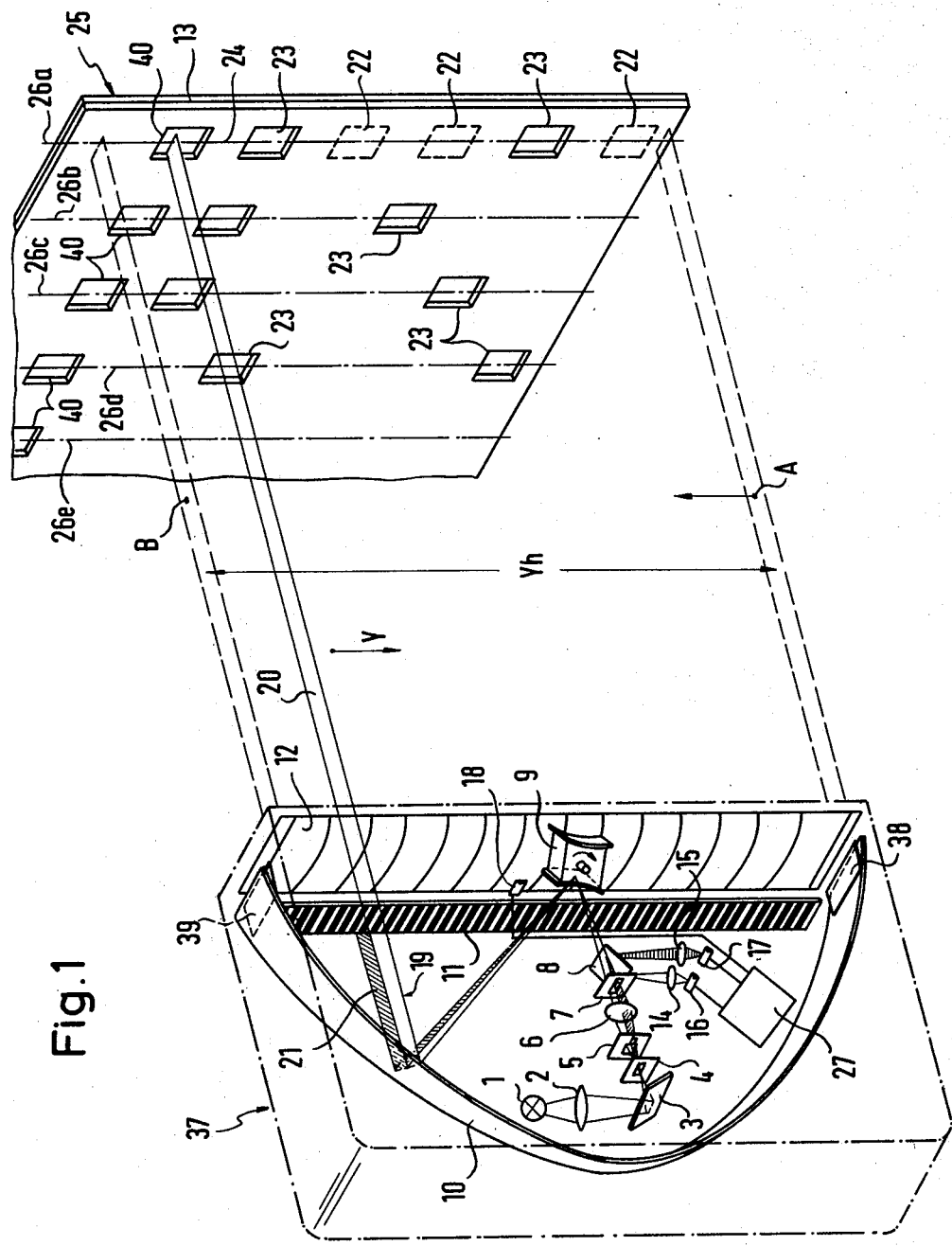

United States Patent [19]
Walter

[11] 3,973,107
[45] Aug. 3, 1976

[54] READING DEVICE FOR OPTICALLY DETECTABLE DIGITAL CODES

[75] Inventor: Arthur Walter, Denzlingen, Germany

[73] Assignee: Erwin Sick Optik-Elektronik, Waldkirch, Germany

[22] Filed: July 29, 1974

[21] Appl. No.: 492,534

[30] Foreign Application Priority Data
Aug. 10, 1973 Germany............................ 2340688

[52] U.S. Cl........................................ 235/61.11 E
[51] Int. Cl.² ................... G06K 7/10; G06K 19/08
[58] Field of Search............. 235/61.11 E; 250/569, 250/570; 340/173 LM; 350/DIG. 2

[56] References Cited
UNITED STATES PATENTS

| | | | |
|---|---|---|---|
| 3,571,571 | 3/1971 | Kapsambelis................. | 235/61.11 E |
| 3,745,351 | 7/1973 | Pudel .......................... | 235/61.11 E |
| 3,812,325 | 5/1974 | Schmidt....................... | 235/61.11 E |
| 3,818,444 | 6/1974 | Connell........................ | 235/61.11 E |
| 3,891,829 | 6/1975 | Dobras......................... | 235/61.11 E |

*Primary Examiner*—Vincent P. Canney

[57] ABSTRACT

A reading device for optically detectable digital codes with two different light-reflecting types of fields. It comprises: a scanning beam arrangement having a timing raster with two different light-reflecting types of serially-numbered fields, means for conducting part of the scanning beam via said timing raster and the rest onto the code fields, a timing signal photoelectric cell receiving the light reflected back by the timing raster, a coding signal photoelectric cell receiving the light reflected back from the code field, and an evaluation electronic system connected to the outputs of the photoelectric cells for determining the length of the code fields in units of the timing raster in the scanning direction. Each code field length is associated with a number of timing fields varying between two predetermined limits.

27 Claims, 7 Drawing Figures

READING DEVICE FOR OPTICALLY DETECTABLE DIGITAL CODES

The invention relates to a reading device for optically-detectable digital codes with two different light-reflecting types of fields which are conducted past a light transmitter-receiver which, within a predetermined visual field transmits light to the field or receives light reflected back therefrom and by means of a photoelectric cell and evaluation electronics connected thereto analyses the code detected by the visual field.

An address recognition system (AEG-Coditron) is known wherein the address is illuminated by a lamp and the backscattered light reaches two photoelectric receptors via an optical system. Corresponding to the amplitude levels of the optical backscattering signals, corresponding electrical signals are generated by an incorporated electronic system. By introducing standard levels by means of evaluating the background light, the arrangement becomes insensitive to interference which could be caused by contamination of the address or the code mark reader.

In the known system the address consists of a sequence of equidistant lines of different length or colour. In the first case the backscattered light is amplitude-modulated and in the second, frequency-modulated. If two amplitude levels or two frequencies are chosen and binary valences are associated therewith, then the contents of any binary-coded information can be converted into an address strip. The bit sequence of the address is read sequentially when the address carrier moves past the code mark reader. Preferably the bits are provided on retroreflective material or in the form of back-illuminated holes.

In the evaluation electronic system, the content of the address is divided up in time and information and two-pulse series are read out on two separate channels, the timing channel and the information channel corresponding to the bit pattern of the address.

In such reading devices, it is important that certain tolerances are allowed in the arrangement between reading device and code. A distinction is made between height tolerance, distance or spacing tolerance, transverse tolerance, information tolerance and obliquity tolerance of the code, which is for example, provided on a card.

In this connection height tolerance is understood to mean a displacement of the code relative to the reading device in the upward or downward direction. Distance or spacing tolerances result from different distances of the code from the reading device. The expression "transverse position tolerance" defines any twisting of the code about a vertical axis whereas "inclination tolerance" designates any twisting of the code about a horizontal transverse axis. "Oblique position tolerance" describes any twisting of the code relative to the reading direction about the connecting line between the reading device and the code.

The problem with the invention is to provide a reading device of the type described hereinbefore which makes it possible to be able to provide tolerances in any manner required by a special reading problem. Therefore, the reading device according to the invention, must be able to supply perfect reading results for all possible tolerances in the arrangement between code and reading device, even if the code carrier is crumpled.

To solve this problem, the invention comprises a scanning beam arrangement which periodically scans the code with a sharply focussed light beam and by receiving the reflected light with a photoelectric cell supplies an electrical output signal which is a measure for the detection of one or other type of field by the light beam. In this way by appropriate association of the code field with the difference scanning field ranges a very reliable indication of a code field within particular tolerances can be obtained. Due to the use of the sharply focussed light beam which can be, in particular a laser beam, the readig device according to the invention, is particularly insensitive to distance tolerances. Due to the use of the scanning beam principle a very large number of different code elements can be provided in the code. In other words, the reading device according to the invention, makes it possible to differentiate between a large number of different code elements. As the above-indicated known address recognition system works with amplitude measurements within a particular solid angle, it only permits the detection of two different measuring pulse lengths, which necessitates considerable lengths on the code cards for detecting particular information. According to the invention however, a large amount of information can be located in a relatively small area even with considerable tolerances, despite the high recognition precision.

It is particularly advantageous if the scanning beam arrangement has a timing raster which also has two different light-reflecting types of serially-numbered fields and if part of the scanning beam is guided over the timing raster and a separate timing signal photoelectric cell is provided for the light reflected by the timing raster. The said timing signal photoelectric cell together with the coding signal photoelectric cell is connected to an evaluation electronic system which associates with each code field, a timing field series comprising a plurality of sequential timing fields.

According to a first advantageous embodiment, in the evaluation electronic system the length of the code fields are determined in the scanning direction in units of the timing raster. In the extreme case, so many different code lengths can be differentiated as there are timing field pulses. However, so as not to allow only distance tolerances, it is preferable to associate with each code field length not a particular number of timing fields but a number of timing fields which is located between two predetermined limits. The existence of a particular code field is therefore indicated with a number of timing fields within the predetermined limits appears at the output of the device in pulse form. By means of a corresponding selection of the fluctuation limits, it is possible to accept a considerable number of misalignments between code field and reading device without impairing the reliability of reading. Advantageously the number of timing fields by which a timing field series associated with a particular code field length, can very is about 10.

According to a further advantageous embodiment, a reference field was provided at the beginning of each code field series, by means of which, a timing field count is started whereby, the code fields are in each case, associated with a particular timing field series of specific serially-numbered timing fields. Therefore, in this embodiment the timing field pulses which occur during a counting operation are provided with ordinal numbers.

In order to permit further tolerances about the different axes, in addition to the considerable distance tolerances possible, according to a special advantageous embodiment, either when determining a code field pulse within the associated timing field pulse series or when there is a code field pulse during the appearance of the central pulse of any timing pulse series, a recognition signal is emitted. Therefore, there are two alternative arrangements for permitting large tolerances. The first is used when there is sufficient space for arranging the code. On both sides of each code field there is then an unused space within which, the code field can be moved, without its recognition being impaired. Within this area it is possible for the code field to be tilted or distorted without there being any risk of non-recognition. Recognition always takes place when the code field pulse is detected within the timing field pulse series associated with the particular code field.

In the second mentioned alternative, there is no space between adjacent code fields. In this case, whenever the central timing pulse occurs the timing pulse series associated with a code field is detected no matter whether there is a code field pulse at the same time or not. In this case, without danger of non-recognition the code field can be displaced to both sides, up to about half its width in the scanning direction. Distortions and oblique positions are also possible without recognition being impaired.

It is vital for the above-indicated embodiments for the time pulses associated with the code field to be provided with ordinal numbers which are identified in a comparative counter.

In practice it is advantageous if 10 to 20 timing fields of the timing raster are associated with each smallest code field of the code. As a result of this arrangement, all the tolerances which occur in practice can be satisfactorily controlled.

If all the code fields are of equal width and separated by a space, their width can be approximately of the same size as the raster constant. Thus in the case of the association of 20 timing fields with the code field, a displacement of each code field to each side of up to 10 timing fields is possible without recognition being impaired. In the case of adjacent code fields of different size, when 20 timing fields are associated with each smallest code fields, it is also possible for the code field to be displaced to both sides by up to 10 timing fields provided that the smallest code field has the width of 20 timing fields in the scanning direction. Therefore, in this case, the smallest code fields are wider in the scanning direction by a multiple than the timing fields.

Inasfar as there is a space between the individual code fields, the timing fields of the timing raster associated with the space are one part added to one code field adjacent to the space and the other part is added to the other code field adjacent to the space. Preferably the timing fields associated with the space are halved between adjacent code fields.

According to a advantageous embodiment, at the beginning and end of the scanning raster extra timing fields are provided which are not associated with any code field. In this way considerable tolerances in the arrangement of the whole code in the scanning direction are possible without the reroute being impaired. This is the height tolerance mentioned hereinbefore. In practice it is particularly advantageous and adequate if approximately the same number of extra timing fields are provided as there are timing fields associated with the code fields. Preferably, there are about 100 extra timing fields and 100 timing fields associated with the code fields.

A particularly simple optical arrangement is obtained if the code fields are arranged on a straight line. Advantageously the code fields occur in columns whereby a plurality of code field columns can be arranged beside one another. Preferably a spacing is provided between adjacent columns.

It is particularly advantageous if the code fields are placed on a punched card backed with reflecting material.

A particularly accurate start is obtained if performed by the end of the reference field pulse.

At the end of each scanning operation, a clearing signal is advantageously generated which resets the timing field count. In order to generate the clearing signal a further photoelectric cell is preferably provided which is briefly illuminated by the scanning beam at the end of every scanning operation.

One advantageous practical embodiment is constructed in such a way that the scanning beam arrangement is an autocollimation arrangement having a mirror wheel upon which acts a light beam as well as a narrow parabolic mirror in the focus of which is located the surface of the particular reflecting mirror and in front of which are juxtaposed the timing raster and a cylindrical lens. This is a digital-measuring light curtain such as is known per se for detecting obstructions in the radius vector range.

At both ends of the scaning range reflectors are preferably arranged in the scanning light beam which reflects back the said beam so that even with complete covering of the reflector an initial and terminal pulse is generated for the following evaluation electronic system.

For measuring code pulse lengths, the evaluation electronic system is advantageously constructed in such a way that the coding signal photoelectric cell optionally via amplifiers and the timing signal photoelectric cell via a differentiation stage, a rectifier stage and optionally amplifiers are connected to an AND gate whose output is supplied to a maximum value counter. On passing the code field arrangement through the scanning range the maximum value counter retains the maximum timing pulse number counted, which is then a measure of the code field length.

Inasfar as a reference pulse is used the evaluation electronic system is advantageously constructed in such a way that the timing pulse photoelectric cell via a differentiation and a rectifier stage and the coding signal phototelectric cell as well as the reference photoelectric cell optionally with the interconnection of amplifiers are connected to a comparison counter which is preferably set to zero by the pulse derived from the reference photoelectric cell and is started by reference pulse at the beginning of each code column and per time pulse is moved forward by one unit.

In a first embodiment the comparison counter during the passage of a timing pulse series associated with each code field constantly checks whether a reflector signal appears whereby it sets or does not set a flip-flop circuit associated with the timing pulse series depending on whether or not a reflector signal appears.

According to a further embodiment, when the central pulse of a timing pulse series occurs the comparison counter queries with the coding signal photoelectric cell whether at that particular time there is a reflector signal or not.

The outputs of the flip-flop circuit or the comparison counter are connected to an evaluation stage which, when a signal occurs at the reference photoelectric cell query with the flip-flop circuits or other elements storing the information obtained and evaluates the result in a desired manner.

Other and further objects of the present invention will be apparent from the following description and claims and are illustrated in the accompanying drawings which, by way of illustration show preferred embodiments of the present invention and the principles thereof, and are what are now considered to be the best modes contemplated for applying these principles. Other embodiments of the invention embodying the same or equivalent principles may be used and structural changes may be made as desired by those skilled in the art without departing from the present invention and the scope of the appended claims.

Figure 2:
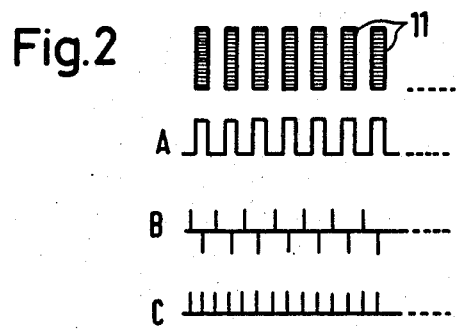
Figure 3:
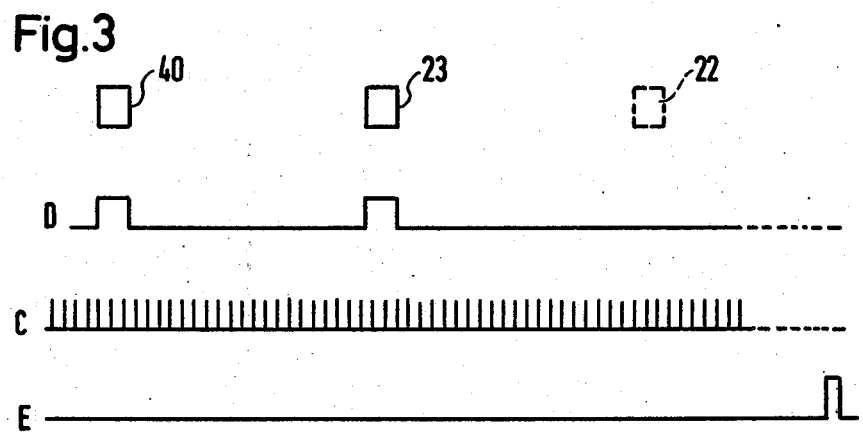
Figure 5:
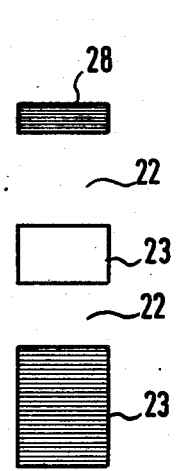
Figure 6:
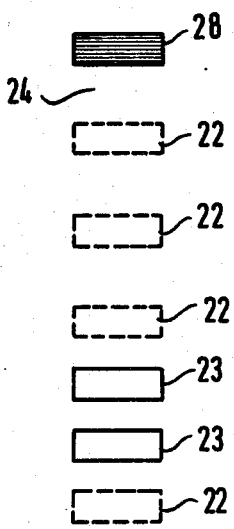
Figure 4:
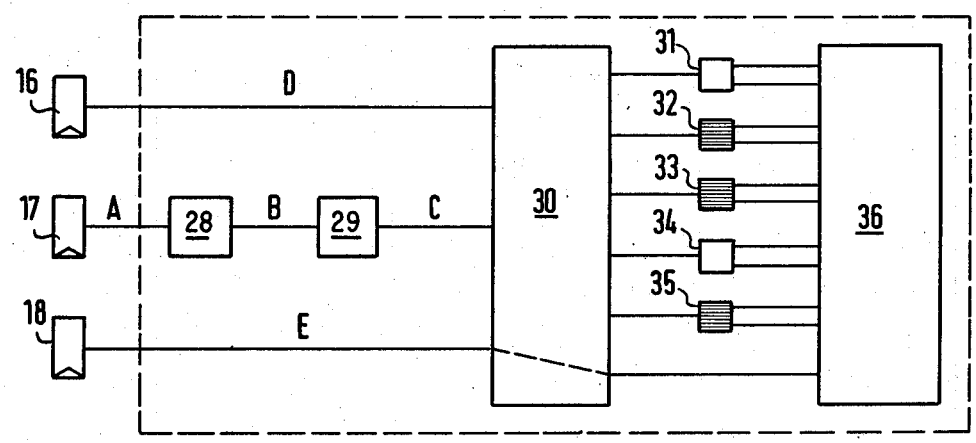
Figure 7:
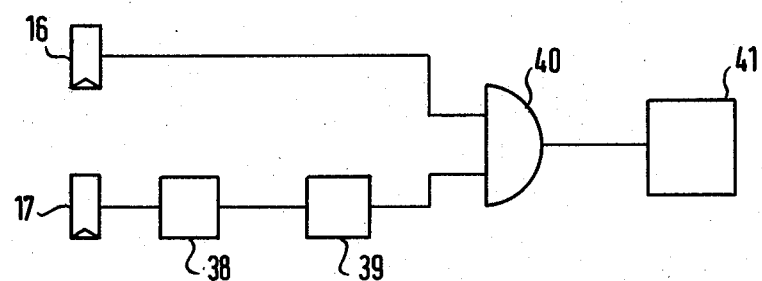

FIG. 1 shows a schematic perspective view of the reading device according to the invention located in front of a punched card backed with a reflecting material, FIG. 2 shows four superimposed diagrams showing the generation of the timing pulse series, FIG. 3 shows four superimposed diagrams describing the association of the different pulses generated in the reading device according to the invention, FIG. 4 shows a schematic block diagram of the evaluation electronic system for one embodiment of the device according to the invention, FIGS. 5 and 6 show two further possible codes for which the reading device according to the invention can be used, and FIG. 7 shows a schematic block diagram of the evaluation electronic system for a further embodiment of the reading device according to the invention.

FIG. 1 shows a per se known digital measuring light curtain 37 but which has been modified in important points for the purpose of the present invention. It has a lamp 1, which via a condenser 2 and a passive reflector 3 illuminates a diaphragm 4 from behind. The light which passes through the diaphragm 4 passes through a further contour diaphragm 5 to be described hereinafter onto an imaging lens 6 reproduces diaphragm 4 on the surface of a mirror wheel 9 by means of a diaphragm 7 associated with the reflector at maximum spacing and a partly pervious mirror 8.

Mirror wheel 9 reflects the incident light to a parabolic mirror 10 which produces the actual scanning beam 19 during the rotation of mirror wheel 9 from A to B. Scanning beam 19 is subdivided into two parts 20, 21 whereof the first emanates from the device through a cyindrical lens 12 and reaches the spaced punched card 25.

The second part 21 of scanning beam 19 passes onto a timing raster 11 arranged parallel to cylindrical lens 12, whereby the said raster comprises alternate reflecting and non-reflecting areas.

The punched card 25 has perforations 23 behind which appears the reflecting surface of a light-reflecting material 13 which is used to back the punched card 25.

Inasfar as partial beams 20, 21 strike reflecting areas they are reflected back into themselves and due to the autocollimation beam pass back to the partly pervious mirror 8 from where, via lenses 14, 15 they are concentrated on photoelectric cells 16, 17. Photoelectric cell 16 is associated with partial beam 20 and photoelectric cell 17 with partial beam 21 which is indicated by corresponding shading of partial beam 21.

Photoelectric cell 16, 17 are connected to an evaluation electronic system 27.

The contour diaphragm 5 has a narrow portion permitting the passage of the light striking raster mirror 11. That portion of light which traverses the wide portion of contour diaphragm 5, passes out of the housing through cylindrical lens 12 and reaches the punched card 25 or the reflecting material 13 located behind the same.

Furthermore, in the terminal area of the scanning movement of the scanning light beam a reference photoelectric cell is provided 18 which is also connected to the evaluation electronic system 27.

Reflectors 38, 39 are arranged at each of the two ends of parabolic mirror 10 which reflects back into themselves the light of the scanning light beam which falls at the ends of the scanning range, so that even in cases where there is no reflection signal back from punched card 25 initial and final signals are generated in the photoelectric cells.

Punched card 25 backed with reflecting material 13 has juxtaposed columns 26a, b, c, d, e etc. of code perforations whereby the first or uppermost series of code perforations 40 are reference code fields which start off a timing pulse count.

Below the reference fields 40 are provided a two or five code whereby 23 designates perforated code fields and 22 non-perforated fields. Therefore partial beam 20 is only reflected back into itself if it falls in reference code fields 40 or perforated code field 23.

In the two or five-codes shown in FIG. 1 a space 24 is left between the individual code fields 22, 23 according to the present invention.

According to FIG. 4 the photoelectric cell 16, 18 are connected directly to a comparison counter 30 and photoelectric cell 17 is connected thereto by a differentiation stage 28 and a rectifier stage 29.

For reasons of clarity the amplifier necessary for the amplifying the electric signals are not shown.

In FIG. 2 in the first row are shown schematically the reflecting and non-reflecting fields of the timing scale 11. In series A located thereunder are shown the reception pulses of photoelectric cell 17 which appear on the connecting line from photoelectric cell 17 to differentiation stage 28. In series B, are shown the differentiated signals which appear between stages 28 and 29 in FIG. 4, whilst in line C are represented the timing pulses supplied to the comparison counter 30 of FIG. 4.

In FIG. 3 the timing pulse series is once again shown in line C. In lines D or E located above or below the same are reproduced the pulse signals which appear at photoelectric cells 16 or 18. In the first line of FIG. 3 is schematically represented the reference code field 40, the first reflecting code field 23 and the first non-reflecting code field 22.

The light beam 19 of the digital measuring light curtain according to FIG. 1 periodically scans the punched card from top to bottom e.g. 500 times per second. Simultaneously timing raster 11 is synchronously covered.

At the output of timing signal photoelectric cell 17 appear the timing pulse series shown with C in FIGS. 2 and 3 whereby each pulse is proportional to a distance $\Delta y$. Inasfar as the number of pulses during a scanning operation is $n$, $\Delta y = (yh/n) \times yh$ is the total scanned level.

It is assumed for example that raster 11 has 100 areas which alternately reflect and do not reflect. In this way timing signal photoelectric cell 17 emits 100 electrical pulses (A in FIG. 2) which are differentiated in the differentiation stage 28 according to FIG. 4 (B in FIG. 2) and are rectified in the rectifier stage 29 according to FIG. 4 (C in FIG. 2). In this way a total of 200 pulses are generated during a scanning operation with each of which is associated a particular $y$ within the scanning range of O to $y_h$.

As can be gathered from FIG. 3, numerous timing pulses can be associated with each reflector signal (D in FIG. 3) appearing at coding signal photoelectric cell 16. In the assumed example, this can take place in the following manner:

| Number of timing pulses supplied | 11–29 | 31–49 | 51–69 | 71–89 | 91–109 |
|---|---|---|---|---|---|
| Code trace | 1 | 2 | 3 | 4 | 5 |

The remaining 91 timing pulses are unused for code recognition purposes. They determine the quantity of the permitted tolerance in guiding the punched card 25 in the y-direction.

A recognition signal is always emitted at the output of comparison counter 30 according to FIG. 4 with a reflection signal (D in FIG. 3) is detected within the associated timing pulse series according to the above table. Thus considerable distortions and displacements of the reflection signals along the time axis are possible but reliable recognition is still ensured.

The recognition signals emitted by the comparison counter 30 within each timing pulse series can, for example, be used to set or not set connected flip-flop circuits 31, 32, 33, 34 and 35. The recognition of the code which has been scanned in FIG. 1 is indicated by corresponding light or dark representations of the boxes 31 and 35. An evaluation stage 36 induced by the clearing signal from the reference photoelectric cell 18 can query the outputs of flip-flop circuits 31 to 35 and evaluate the result established in any desired manner.

FIG. 6 shows another code such as can be applied to punch card 25. In this case at particular distances 24, reflecting or non-reflecting areas 23 or 22 of equal width are provided whereby the distances from the reference line represent multiples of a desired value.

The code shown schematically in FIG. 5, is particularly advantageously used if there is little space for arranging the code in the scanning direction. In this case, the reflecting and non-reflecting code areas 23 or 22 are immediately adjacent to one another.

In this case, for example, 10 timing pulses are associated with each code field unit. Querying by the comparison counter 30 always takes place in the middle of each timing pulse series, i.e. for example, at timing pulses 5, 15, 25 up to timing pulses 95 provided that, as in the previous example, 100 timing pulses are used. The recognition is not impaired by a displacement of the centre point of the individual code fields by a half code width.

FIG. 7 shows a simplified embodiment wherein the photoelectric cell 16 is applied directly or via not shown amplifiers to one input and photoelectric cell 17 is applied to the other input of an AND gate 40 via a differentiation stage 38 and a rectifier stage 39 and optionally via not shown amplifiers. The output of the AND gate leads to a maximum value counter 41. It is possible in simple manner with this arrangement to measure pulse length. The timing pulses can only pass through the AND gate 40 when a code field pulse is present and are then counted by the maximum value counter 41. The maximum value determined on passing the code field carrier through the scanning range of counter 41 is then a measure for the length of the code field. By associating a larger number of timing field pulses with a particular code field length, it is thus possible to permit considerable tolerances e.g. the crumpling of the code field carrier card without thereby impairing the reliable indication of a particular code field length.

While there has been described and illustrated the preferred embodiments of the invention it is to be understood that these are capable of variation and modification and it is therefore not desired to be limited to the precise details set forth but to include such modifications and alterations as fall within the scope of the appended claims.

What is claimed is:

1. A reading device for optically detectable digital codes with two different light-reflecting types of fields, comprising: a scanning beam arrangement for periodically scanning the code with a sharply focused light beam and for receiving the light reflected therefrom, said scanning beam arrangement having a timing raster having two different light-reflecting types of serially-numbered fields, means for conducting part of the scanning beam via said timing raster, a timing signal photoelectric cell arranged to receive the light reflected back by said timing raster, a coding signal photoelectric cell arranged to receive the light reflected back from the code fields, an evaluation electronic system connected to the outputs of said photoelectric cells for determining the length of the code fields in units of the timing raster in the scanning direction, each code field length being associated with a number of timing fields varying between two predetermined limits.

2. A reading device according to claim 1 in which the code fields are arranged in a straight line.

3. A reading device according to claim 1 in which the code fields are arranged in columns.

4. A reading device according to claim 1 in which the code fields are located on a punched card which is backed with a reflecting material.

5. A reading device according to claim 1 in which the scanning beam arrangement is an autocollimation arrangement having a mirror wheel upon which acts a light beam and a strip-like parabolic mirror in the focus of which is located the surface of the particular reflecting mirror and in front of which are juxtaposed the timing raster and a cylindrical lens.

6. A reading device according to claim 1 in which at both ends of the scanning range reflectors are provided in the scanning light beam which reflect the light beam back into itself.

7. A reading device according to claim 1, in which the number of timing fields associated with a particular code field length varies by about 10.

8. A reading device according to claim 1, in which said evaluation electronic system comprises an: AND gate, said coding signal photoelectric cell being directly connected to said AND gate and said timing signal photoelectric cell being connected indirectly to said AND gate, a differentiation stage and a rectifier stage being interposed between said AND gate and said timing signal photoelectric cell, and a maximum value counter connected to the output of said AND gate.

9. A reading device according to claim 8, which comprises amplifier means interposed between said AND gate and said coding signal photoelectric cell and said rectifier stage, respectively.

10. A reading device according to claim 1, in which at the beginning and end of the timing raster an extra quantity of timing fields are provided which are not associated with any code field.

11. A reading device according to claim 10, in which approximately the same number of extra timing fields are provided as there are timing fields associated with the code fields.

12. A reading device according to claim 11, in which approximately 100 extra time fields and approximately 100 timing fields associated with the code fields are provided.

13. A reading device according to claim 1 in which several code field columns are juxtaposed which are moved at right angles to the column direction and to the optical axis of said beam arrangement.

14. A reading device according to claim 13, in which a space is left between adjacent columns.

15. A reading device according to claim 1, in which at the beginning of each code field series a reference field is provided by which a timing field count is started, and wherein the code fields are in each case associated with a particular timing field series comprising clearly defined serially-numbered timing fields.

16. A reading device according to claim 15, in which the timing field count is started by the end of the reference field pulse.

17. A reading device according to claim 15, in which with each smallest code field of the code are associated 10 to 20 timing fields of the timing raster.

18. A reading device according to claim 15, which comprises means for generating a clearing signal for resetting the timing field count at the end of each scanning operation.

19. A reading device according to claim 18, in which said means for generating said clearing signal comprises a further photoelectric cell associated with said scanning beam arrangement for receiving reflected light at the end of each scanning operation.

20. A reading device according to claim 15, in which inasfar as there is a space between the individual code fields the timing fields of the timing rasters associated with the space are for one part added to the one code field adjacent to the space, and for the other part, to the other code field adjacent to the space.

21. A reading device according to claim 20, in which the timing fields associated with the space are distributed by halves over the adjacent code fields.

22. A reading device according to claim 15 comprising a comparison counter, said timing signal photoelectric cell being connected to said comparison counter by means of a differentiation stage and a rectifier stage, said coding signal photoelectric cell and said reference photoelectric cell being directly connected to said comparison counter.

23. A reading device according to claim 22, wherein amplifier means are interposed between said comparison counter and said photoelectric cells.

24. A reading device according to claim 22, in which the counter is started by the reference pulse at the start of each code column and is moved forward by one unit per timing pulse.

25. A reading device according to claim 22, in which the comparison counter is set to zero by the pulse derived from the reference photoelectric cell.

26. A reading device according to claim 22, which comprises a flip-flop circuit connected to said comparison counter, said comparison counter operating said flip-flop circuit during the running of the timing pulse series each of which is associated with a code field, in response to a reflector signal received by said counter.

27. A reading device according to claim 26, which comprises an evaluation stage connected to the output of said flip-flop circuit and means in said evaluation stage for evaluating signals received from said reference photoelectric cell.

* * * * *